United States Patent
Iso et al.

(10) Patent No.: US 7,399,386 B2
(45) Date of Patent: Jul. 15, 2008

(54) MAGNETIC RECORDING MEDIUM, METHOD OF MANUFACTURING THE SAME AND MAGNETIC RECORDING APPARATUS

(75) Inventors: Akira Iso, Nagano (JP); Makoto Isozaki, Nagano (JP)

(73) Assignee: Fuji Electric Device Technology Co., Ltd. (JP)

( * ) Notice: Subject to any disclaimer, the term of this patent is extended or adjusted under 35 U.S.C. 154(b) by 752 days.

(21) Appl. No.: 10/198,620

(22) Filed: Jul. 17, 2002

(65) Prior Publication Data
US 2003/0068508 A1    Apr. 10, 2003

(30) Foreign Application Priority Data
Jul. 17, 2001    (JP)    ............................. 2001-216941

(51) Int. Cl.
*C23C 14/34*    (2006.01)

(52) U.S. Cl. .............................. 204/192.16; 204/192.2; 204/192.14

(58) Field of Classification Search .............. 428/694 T, 428/694 TS, 694 TP, 694 B, 694 BP, 694 BS, 428/694 ST, 694 SL; 204/192.14, 192.15, 204/192.16, 192.2
See application file for complete search history.

(56) References Cited

U.S. PATENT DOCUMENTS

| 4,597,844 A | * | 7/1986 | Hiraki et al. | ............ | 204/192.15 |
| 4,772,522 A | * | 9/1988 | Kubota et al. | ................ | 428/328 |
| 5,766,766 A | * | 6/1998 | Sasaki et al. | ................. | 428/408 |

FOREIGN PATENT DOCUMENTS

| JP | 61-267928 | * | 5/1985 |
| JP | 62-40614 | * | 2/1987 |
| JP | 62-114124 | * | 5/1987 |
| JP | 64-14716 | * | 1/1989 |
| JP | 1-243222 | * | 9/1989 |

* cited by examiner

*Primary Examiner*—Rodney G McDonald
(74) *Attorney, Agent, or Firm*—Rossi, Kimms & McDowell, LLP

(57) ABSTRACT

A magnetic recording medium using a plastic substrate as a non-magnetic substrate includes an adhesive layer that prevents film expansion even under severe conditions. The adhesive layer has a chemical affinity to the plastic substrate and is formed on the surface of the plastic substrate, and an underlayer and subsequent layers are formed over the adhesive layer. A polymerized carbon film is used as the adhesive layer.

3 Claims, No Drawings

MAGNETIC RECORDING MEDIUM, METHOD OF MANUFACTURING THE SAME AND MAGNETIC RECORDING APPARATUS

BACKGROUND

With ever increasing recording density of magnetic recording media, the surfaces of the magnetic recording media need to be flat to enable the recording head to float closely over the surface. To improve the magnetic recording media, a variety of proposals have been made with regard to the composition and structure of magnetic layers, materials for non-magnetic underlayer, materials for non-magnetic substrates, and so forth. Aluminum and glass are mainly used as material for the non-magnetic substrates, but plastic materials, in particular high polymer resin material, have been proposed as materials for the non-magnetic substrates based on their characteristics.

It is desirable for the high recording density magnetic recording media to have long-term reliability, even for use in the severe environment, to enable a low floating magnetic head to maximize a higher recording density, and for digital electric home appliances that are expected to be widely used in the near future. An extremely low temperature of −40° C. to a high temperature and high humidity of 80° C./80% RH are assumed as the severe conditions, and under such conditions, the future magnetic recording media need to be durable, such as being operable without any problem for five years. Further, the cost of the magnetic recording media for use with the digital electric home appliances needs to be considerably lower than that of the conventional magnetic recording media. Magnetic recording media using plastic substrates have a future, but they need to be improved for use with severe conditions. That is, if a conventional magnetic recording medium using a plastic substrate is subjected to severe conditions, film expansion, i.e., a kind of film exfoliation, can occur.

There is a need for a magnetic recording medium, which uses a plastic substrate, that overcomes the film expansion problem. The present invention addresses this need.

SUMMARY OF THE INVENTION

The present invention relates generally to a magnetic recording medium, which can be used with various kinds of magnetic recording apparatuses, such as an external storage of a computer, a method of manufacturing the magnetic recording medium, and a magnetic recording apparatus that uses the magnetic recording medium.

One aspect of the present invention is a magnetic recording medium having at least a non-magnetic underlayer, a magnetic layer, and a protective layer sequentially formed over a plastic substrate. According to the present invention, an adhesive layer having a chemical affinity to the plastic substrate is formed on a surface of the plastic substrate.

Another aspect of the present invention is a method of manufacturing the magnetic recording medium. In this method, the adhesive layer having a chemical affinity to the plastic substrate is formed on a surface of the plastic substrate. The underlayer is then formed over the adhesive layer.

Another aspect of the present invention is a magnetic recording apparatus that uses or includes the magnetic recording medium.

The adhesive layer can be a carbon film. The carbon film can contain a predetermined amount of hydrogen and can have a polymer structure. A value B/A (a value that is found by dividing a measured diffusing intensity (value B) by a calibrated diffusing intensity (value A)) of a Raman spectrum acquired by the Raman scattering spectroscopy of the carbon film can be equal to or greater than 6. Moreover, the carbon film can be formed under presence of mixed gas containing hydrogen gas or hydride gas. The percentage of the hydrogen gas or the hydride gas in the mixed gas can be equal to or higher than 25%. The concentration of the hydrogen gas is such that a range of the value B/A can be equal to or greater than 6.

DETAILED DESCRIPTION

The present inventors, through various experiments and studies, found the solution to the problems noted above. A large number of magnetic recording media were placed under the above-mentioned severe conditions to cause film expansion. The locations of the film expansion were observed. It was discovered that the film expands mainly between the plastic substrate and an underlayer formed directly on the plastic substrate. This phenomenon was thought to be caused by the chemical structure of the plastic substrate having a low affinity to the chemical structure of the layer formed thereon, which causes distortion stress concentrated on an interface having a low affinity.

To address this problem, the present inventors formed a layer having a high affinity in chemical structure to a plastic substrate and to an underlayer and a magnetic layer formed on the plastic substrate. This layer was formed on the surface of the plastic substrate, and a conventional underlayer, a magnetic layer, etc., was sequentially laminated onto that layer. The present inventors discovered that a carbon film, and more particularly a polymerized carbon film, was suitable as a material for the layer (hereinafter referred to as "adhesive layer") having a high affinity in chemical structure to both the plastic substrate and the layers laminated thereon. Polymerization causes the carbon film to have a high affinity in chemical structure to a plastic substrate. The carbon film also has a high affinity to an underlayer comprised of a TiW film and the like, which is laminated on the carbon film. Forming the adhesive layer comprised of the carbon film improves the adhesion between the plastic substrate and the underlayer, and prevents film exfoliation even if the distortion stress is applied to the magnetic recording medium under severe conditions.

Although the method of forming the carbon film is not particularly restricted, the carbon film can be ordinarily formed by the sputtering method, disposition method, or CVD method. The carbon film can be polymerized by including therein a predetermined amount of hydrogen atoms. The degree to which the carbon film is polymerized can easily be determined by the Raman scattering spectroscopy. This is based on the following principle and the conventional knowledge.

It is well known that an increase in the degree of polymerization of an organic film or a carbon film (an increase in polymerized components) increases the intensity of fluorescence generated in time of light incidence on the film. The degree of polymerization and the intensity of generated fluorescence are substantially proportional to each other.

On the other hand, the Raman effect in which light is scattered with a frequency differing from that of incident light is known as a phenomenon occurring when light is irradiated on a substance as is the case with the fluorescent light. A variety of Raman spectrum meters are commercially available for use in the Raman scattering spectroscopy in which the Raman spectrum is measured by utilizing the Raman effect, and the energy level of an object is identified and determined. The Raman scattering spectroscopy is widely used for identification and determination of laminating layer film to which the present invention relates to. The Raman spectrum found by the Raman scattering spectroscopy represents the intensity of Raman scattered light with respect to the Raman shift (wave number). Not only does the Raman scatter light, but also the fluorescent light may be emitted upon incidence of light according to irradiated substances. In this case, the emitted fluorescent light is expressed as a background level of a spectrum curve, and thus, the measured intensity of the Raman spectrum corresponds to the sum of the fluorescent light intensity and the Raman scattered light intensity. Therefore, a value that is found by subtracting the fluorescent light intensity (a value from a base line to a background level in a Raman spectrum diagram; hereinafter referred to as "the value X") from the measured intensity (a value from the base line level to a peak point in the Raman spectrum diagram; hereinafter referred to as "the value B"), namely (B−X), corresponds to a calibrated Raman scattered light intensity (hereinafter referred to as "the value A").

As a result of various experiments and studies conducted based upon the above knowledge, the present inventors discovered that the polymerization of the carbon film can be satisfactorily determined with excellent repeatability by picking up the Raman spectrum of the carbon film, reading the values B and A of the spectrum, and dividing the value B by the value A (the resulting value will be hereinafter referred to as "the value B/A"), and determining the degree of polymerization of the measured film according to the value B/A.

Namely, the carbon film forming the adhesive layer is polymerized by including therein a predetermined amount of hydrogen, and the suitable amount of hydrogen in atmospheric gas introduced during the film formation can be found with reference to the value B/A of the Raman spectrum obtained by the Raman scattering spectroscopy of the formed carbon film. In this case, the value B/A can be equal to or greater than 6.

The present inventors conducted experiments and studies to find the optimum value of the film thickness of the carbon film, and reached the following conclusion. There is no need to restrict the film thickness since the film thickness does not greatly affect the occurrence of film exfoliation. However, the film thickness affects the read write characteristics so that the film thickness needs to be adjusted to lie within a range that does not deteriorate the read write characteristics. From this standpoint, the optimum value of the film thickness varies according to materials for the magnetic layer and the target recording density, and therefore, the optimum value of the film thickness should not be restricted to a specific value.

According to the present invention, the adhesive layer formed of the carbon film containing a large amount of hydrogen is formed on the plastic film. Including a large amount of hydrogen in the carbon film polymerizes the carbon film. The polymerization causes the carbon film to have affinity in chemical structure to the plastic substrate. Therefore, the carbon film has a high adhesiveness to both the plastic substrate and the underlayer and the like laminated on the plastic substrate. This considerably reduces the occurrence of film exfoliation, unlike the prior art.

A description of the preferred embodiments of the present invention will follow. But it should be understood that they are only exemplary examples of the present invention, and thus the present invention is not to be limited thereto.

According to a first example, an adhesive layer formed of a carbon film containing hydrogen (hereinafter referred to as "CH film") was formed by a known sputtering method using a carbon target. Ar+$H_2$ gas was used as the atmosphere in sputtering, and various adhesive layers were formed by changing the concentration of hydrogen in the gas. Table 1 shows the results. The magnetic recording medium comprises a substrate, an adhesive layer, an underlayer, an intermediate layer, a magnetic layer, a block layer, and a protective layer. These layers are composed of a plastic substrate, a CH film, a TiW film, a Ru film, a CoCrPt—$SiO_2$ film, a Ti film, and a CN film, respectively. The adhesive layer has a film thickness of 10 nm. The resulting magnetic recording medium sample was left under such conditions as ordinary temperature, temperature of 80° C./80% RH (four hours), −40° C. (four hours), and ordinary temperature, in this cycle. Whether the film of the sample expanded or not was determined by observing the sample with an optical microscope. A B/A value of the CH film is a value that is calculated from a Raman spectrum of the sample as stated previously.

TABLE 1

| Concentration of hydrogen gas (%) | Raman spectrum B/A value | Result of exposure Film expanded? | Others |
|---|---|---|---|
| 0 | 1.34 | Yes | Cracked after film formation |
| 5 | 1.48 | Yes | Cracked after film formation |
| 10 | 1.72 | Yes | Cracked after film formation |
| 15 | 2.04 | Yes | Cracked after film formation |
| 20 | 2.71 | Yes | Cracked after film formation |
| 25 | 6.10 | No | — |
| 30 | 9.07 | No | — |

As is clear from Table 1, if the concentration of the hydrogen gas reaches 25%, the B/A value of the Raman spectrum rapidly increases from 3.0 or smaller to 6.1. This indicates that the carbon film became polymerized. The polymerization of the carbon film prevents the film expanding or cracking after the film formation. On the other hand, if the concentration of the hydrogen gas is not greater than 20%, the B/A value of the Raman spectrum is not greater than 3.0, and the formed film is a relatively hard amorphous carbon film. This amorphous carbon film is similar to diamond in structure, and is therefore called a DLD (Diamond Like Carbon) film. This film, however, cracked after the film formation.

According to a second example, an adhesive layer formed of a carbon film containing hydrogen was formed by a known sputtering method using a carbon target, as in the first example. Ar+$H_2$ gas was used as the atmosphere in sputtering, and but various adhesive layers were formed with the concentration of the hydrogen fixed at 25% while changing the thickness of the carbon film. Table 2 shows the results of the film formation. The magnetic recording medium comprises a substrate, an adhesive layer, an underlayer, an intermediate recording magnetic layer, a block layer, and a protective layer that are composed of a plastic substrate, a CH film, a TiW film, a Ru film, a CoCrPt—$SiO_2$ film, a Ti film, and a CN film, respectively, as in the first example. The adhesive layer also has a film thickness of 10 nm. The resulting magnetic recording medium sample was left in a constant temperature oven under such conditions as ordinary temperature, temperature of 80° C./80% RH (four hours), −40° C. (four hours), and ordinary temperature, in this cycle, as in the first example. Whether the film of the sample expanded or not was determined by observing the sample through an optical microscope. A B/A value of the CH film is a value that is calculated from a Raman spectrum of the sample.

TABLE 2

| CH film thickness (nm) | Raman spectrum B/A value | Result of exposure | |
|---|---|---|---|
| | | Film expanded? | Read-write characteristics |
| 4 | 6.5 | No | Favorable |
| 6 | 6.7 | No | Favorable |
| 8 | 6.1 | No | Favorable |
| 10 | 6.1 | No | Favorable |
| 20 | 6.3 | No | Unfavorable |

With respect to the film expansion, the adhesive layer does not depend on the film thickness, and the film did not expand, when the B/A value of the Raman spectrum is kept not smaller than 6. With respect to the film thickness of the CH film (carbon film), there is no problem insofar as forming the CH film to have a thickness to achieve favorable read write results.

As described above, according to the present invention, the adhesive layer formed of the carbon film is formed on the plastic substrate by forming the film having with the B/A value of the Raman spectrum equal to or greater than 6 in atmosphere of the mixed gas containing hydrogen of not less than 25%. With the present adhesive layer, the magnetic recording medium using a plastic substrate does not undergo any film expansion, even when it is exposed to such conditions as −40° C. to 80° C./80% RH.

Given the disclosure of the present invention, one versed in the art would appreciate that there may be other embodiments and modifications within the scope and spirit of the present invention. Accordingly, all modifications and equivalents attainable by one versed in the are from the present disclosure within the scope and spirit of the present invention are to be included as further embodiments of the present invention. The scope of the present invention accordingly is to be defined as set forth in the appended claims.

The disclosure of the priority application, JP PA 2001-216941, in its entirety, including the drawings, claims, and the specification thereof, is incorporated herein by reference.

We claim:

1. A method of manufacturing a magnetic recording medium comprising at least a non-magnetic underlayer, a magnetic layer, and a protective layer sequentially formed over a plastic substrate, comprising the steps of:
   forming an adhesive layer composed of a carbon film, having a chemical affinity to the plastic substrate formed on a surface of the plastic substrate, by sputtering carbon under presence of a mixed gas containing hydrogen gas or hydride gas; and
   forming the underlayer over the adhesive layer,
   wherein the carbon film has a polymer structure, and
   wherein the percentage of the hydrogen gas or the hydride gas in the mixed gas is equal to or higher than 25%, and
   wherein a value of (measured diffusing intensity)/(calibrated diffusing intensity) in a Raman spectrum of the carbon film is equal to or greater than 6.

2. A method according to claim 1, wherein the percentage of the hydrogen gas or the hydride gas in the mixed gas is 25%.

3. A method according to claim 1, wherein the percentage of the hydrogen gas or the hydride gas in the mixed gas is 30%.

* * * * *